(12) United States Patent
Feller et al.

(10) Patent No.: US 12,386,099 B2
(45) Date of Patent: Aug. 12, 2025

(54) SENSOR

(71) Applicant: Leuze electronic GmbH + Co. KG, Owen/Teck (DE)

(72) Inventors: Bernhard Feller, Friedberg (DE); Andreas Jüttner, Munich (DE); Daniela Kessler, Laichingen (DE); Frank Schreiber, Beienfurt (DE); Joachim Koperski, Ottobrunn (DE)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 301 days.

(21) Appl. No.: 18/099,922

(22) Filed: Jan. 21, 2023

(65) Prior Publication Data

US 2023/0266495 A1  Aug. 24, 2023

(30) Foreign Application Priority Data

Feb. 22, 2022 (EP) ..................................... 22157858

(51) Int. Cl.
*G01V 8/20* (2006.01)
(52) U.S. Cl.
CPC ..................................... *G01V 8/20* (2013.01)

(58) Field of Classification Search
CPC .............. G01V 8/10; G01V 8/20; F16P 3/144
See application file for complete search history.

(56) References Cited

FOREIGN PATENT DOCUMENTS

DE 102007035248 A1 * 2/2009 .............. F16P 3/141

OTHER PUBLICATIONS

Omron, Safety Light Curtain F3SJ-B, 2020 (Year: 2020).*

* cited by examiner

*Primary Examiner* — Maurice C Smith
(74) *Attorney, Agent, or Firm* — Michael Soderman

(57) ABSTRACT

A sensor for detecting objects within a monitoring range, with sensor components and an evaluation unit (9). An object detection signal is generated in the evaluation unit (9) in dependence upon sensor signals of the sensor components. The sensor has a device connection unit (10) having connection means designed for connecting to a connection module (11). A configuration jumper and/or a configuration memory (17) can be attached to the device connection unit (10). Thereby a signal distribution can be preset to connection elements of the connection module (11) and/or an operating mode of the sensor can be preset.

19 Claims, 4 Drawing Sheets

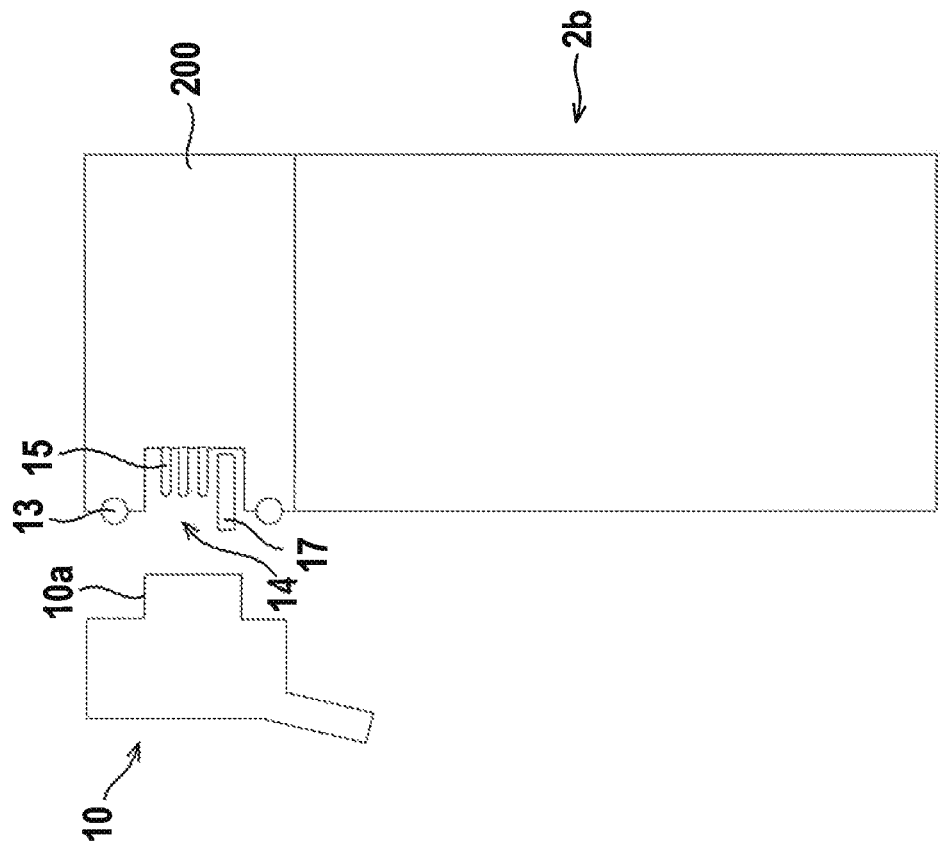
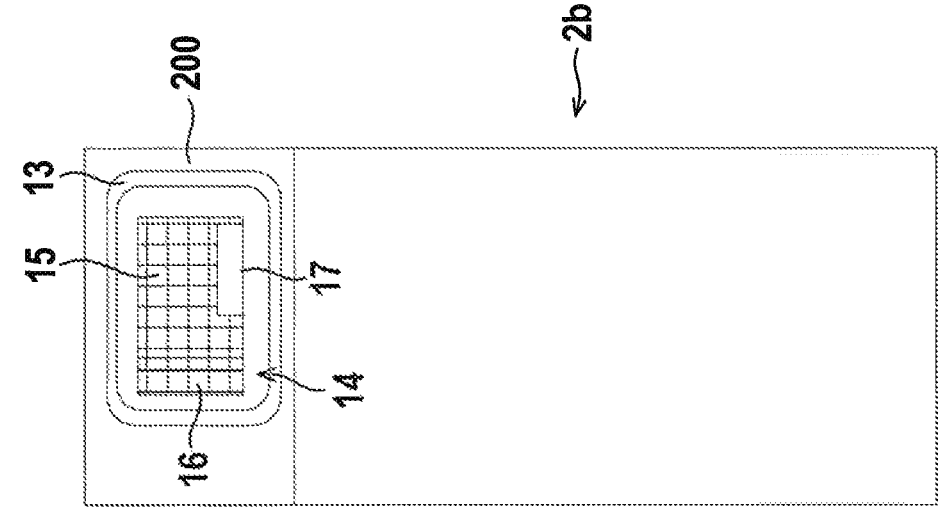

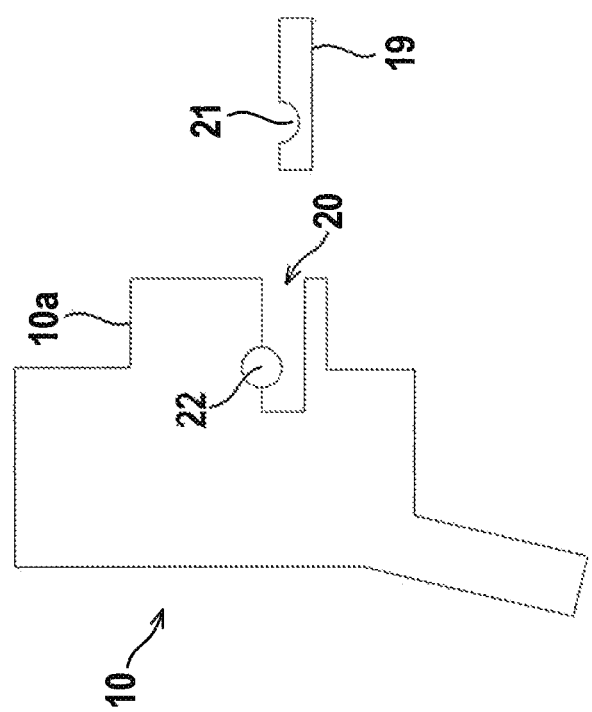
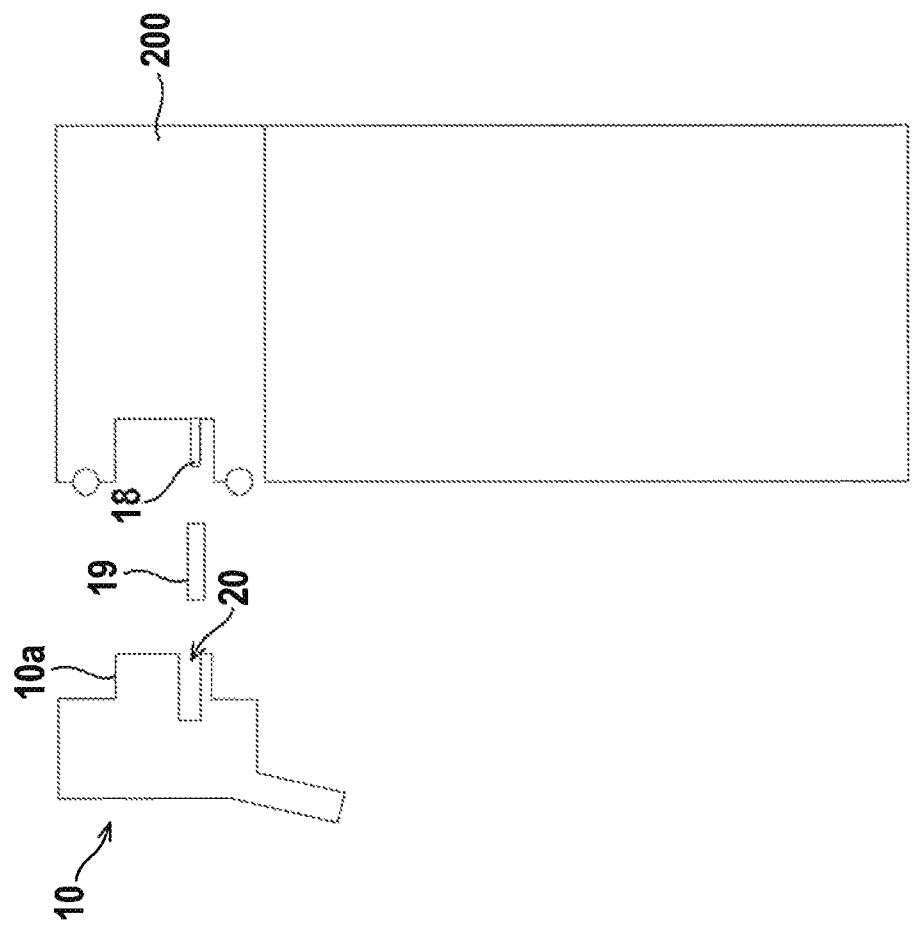

SENSOR

CROSS REFERENCE TO RELATED APPLICATIONS

This application claims the priority of EP 22157858.6 filed on 2022 Feb. 22; this application is incorporated by reference herein in its entirety.

BACKGROUND

The invention relates to a sensor.

Such optical sensors are generally used for detecting objects within a monitoring range.

The sensor can be designed particularly as an optical sensor.

In the simplest embodiment, the optical sensor has only a light beam-emitting transmitter and a light beam-receiving receiver as sensor components. In this context, the optical sensor can be designed as a photoelectric proximity sensor, photoelectric distance sensor, retro-reflective sensor and similar, wherein in these embodiments, the transmitter and the receiver are integrated in a shared housing. Furthermore, the optical sensor can also be designed as a through-beam photoelectric sensor. In this case, the transmitters and receivers are housed in separate housings.

In general, the optical sensor can also have multiple transmitters and/or receivers. A light curtain is an example of such an optical sensor.

Typically the light curtain comprises a series arrangement of light beam-emitting transmitters in a first housing on one edge of the monitoring range and a series arrangement of light beam-receiving receivers in a second housing at the opposite edge of the monitoring range.

The optical sensor has, as an electronic component, an evaluation unit in which an object detection signal is generated in dependence upon received signals of the one or more receiver(s). This object detection signal can be designed particularly as a binary switching signal, the switch states of which indicate whether an object is located within the monitoring range, or not. Alternatively, the object detection signal can be an analog signal, for example, a distance value.

The sensor typically has a connection module, e.g., a plug connector, for outputting the object detection signal and, if applicable, further output signals, as well as for inputting input signals.

In this regard, it is generally disadvantageous that the number of connection elements of such a connection module is narrowly limited. Furthermore, the signal distribution to the individual connection elements is fixed depending on the type of connection module. It is therefore not possible to configure the connection element of the connection module.

SUMMARY

The invention relates to a sensor for detecting objects within a monitoring range, with sensor components and an evaluation unit (9). An object detection signal is generated in the evaluation unit (9) in dependence upon sensor signals of the sensor components. The sensor has a device connection unit (10) having connection means designed for connecting to a connection module (11). A configuration jumper and/or a configuration memory (17) can be attached to the device connection unit (10). Thereby a signal distribution can be preset to connection elements of the connection module (11) and/or an operating mode of the sensor can be preset.

DETAILED DESCRIPTION

The invention seeks to solve the problem of supplying a sensor of the type mentioned at the outset which can be adjusted to different requirements flexibly and with minimal design effort.

The features of the independent claims are provided to solve this problem. Advantageous embodiments and useful further developments are provided in the dependent claims.

The invention relates to a sensor for detecting objects within a monitoring range, with sensor components and an evaluation unit. An object detection signal is generated in the evaluation unit in dependence upon sensor signals of the sensor components. The sensor has a device connection unit that has connection means designed for connecting to a connection module. A configuration jumper and/or a configuration memory can be arranged on the device connection unit, by which jumper and/or memory a signal distribution to connection elements of the connection module and/or an operating mode of the sensor can be preset.

The invention further relates to a corresponding method.

The sensor according to the invention serves to detect objects within a monitoring range. For this purpose, the sensor has sensor components and an evaluation unit, wherein an object detection signal is generated in the evaluation unit in dependence upon sensor signals.

The sensor has a connection module in a known manner, such as e.g., a plug connector which on the one hand serves solely for power supply of the sensor and on the other hand, has connection elements via which input signals can be input into the sensor and output signals can be output by the sensor.

This interface is configurable according to the invention, such that the function of the sensor itself can be preset by an operating mode selection. Alternatively or additionally, the signal distribution to the connection elements can be adapted for each use case. In this manner, connection compatibility with different external units to which the sensor can be connected with the connection module is particularly brought about.

This configurability is achieved in that the sensor has a device connection unit with a configuration memory and/or with configuration jumpers.

A certain configuration can be preset in hardware using the configuration jumpers. A configuration can be preset using the configuration memory, through data stored therein.

Depending on the design of the configuration jumpers and/or of the configuration memory, a specific signal distribution is set for the connection elements of the connection module and/or an operating mode of the sensor is set.

In the simplest case, different configuration jumpers or configuration memories can be used in order to preset different configurations of the sensor.

According to a first advantageous further development, the or each configuration memory can be parameterized via an interface.

The configuration memory is then a memory module with an own interface to which an external device can be connected in order to read configuration data into the configuration memory. In general, the external device can be implemented as a computing unit. Different configurations of the sensor can be preset by reading in different configuration data.

According to a second advantageous further development, both a configuration memory as well as a configuration jumper are provided at the device connection unit. A configuration can then be selected in a configuration memory with the configuration jumpers.

Different configurations, which are preset through configuration data stored in the configuration memory, can therefore be set through different settings of configuration jumpers.

In general, a configuration jumper forms a conductive bridge over which a ground connection can be established. Information corresponding to a bit is made available by the configuration jumper, together with a pull-up resistor. Therefore, with N configuration jumpers, $2^N$ addresses can be generated, which can be used for selecting different configurations for the connection module, e.g., operating modes or signal distributions.

According to an advantageous design embodiment, the sensor has at least one housing, wherein the device connection unit can be fastened to a portion of the housing.

In this context, a seal is provided between the housing portion and the device connection unit.

The seam between the device connection unit and the housing of the sensor is therefore fully sealed.

According to a first variant, the configuration memory and/or the configuration jumpers can be plugged in at the housing portion.

Through the plug connection, the configuration memory and/or the configuration jumpers form a modular unit with the housing, upon which the device connection unit is then guided, such that when the device connection unit is fixed at the housing portion, the configuration memory and/or the configuration jumpers are then engaged by the device connection unit.

According to a second variant, the configuration memory and/or the configuration jumpers can be plugged in at the device connection unit.

In this case, by way of the plug connection, the configuration memory and/or the configuration jumpers form a modular unit with the device connection unit, which is then set on top of the housing portion such that when the device connection unit is fixed at the housing portion of the configuration memory and/or the configuration jumpers are then engaged by the housing portion.

In general, it is also possible for hardwired configuration jumpers to be provided in the device connection unit.

The connection module, which is particularly formed as a plug connector, can be connected to the device connection unit via a cable.

Advantageously, the connection module and the cable can be cast or injection-molded together.

Alternatively, the device connection unit and the cable can be cast or injection-molded together.

The sensor according to the invention can be formed particularly as a safety sensor, i.e., the sensor then has a failsafe design such that it can be used in safety-related applications, for example, for protection of persons.

A failsafe design is realized particularly through a redundant, advantageously dual-channel, design of the evaluation unit, for example, in the form of two computing units cyclically monitoring one another.

If an error is realized by the computing units of the evaluation unit, the safety sensor enters the safe state, for example, in that it generates an object detection signal with which a monitored, hazardous machine is switched off.

In principle, the sensor according to the invention can be a radar sensor or an ultrasonic sensor. Particularly preferably, the sensor is an optical sensor.

The optical sensor can be formed particularly as an area distance sensor, i.e., as a scanning distance sensor or as a light curtain.

BRIEF DESCRIPTION OF THE DRAWINGS

The invention is explained in the following with reference to the drawings. They show:

FIG. 3A: A detail depiction of a housing portion of the light curtain with an assigned device connection unit.

FIG. 3B: A top-down view onto the housing portion according to FIG. 3A.

FIG. 4: A variant of the embodiment according to FIG. 3A.

FIG. 5: A specific design embodiment of the device connection unit according to FIG. 4.

DETAILED DESCRIPTION OF THE PREFERRED EMBODIMENTS

Figure 1:
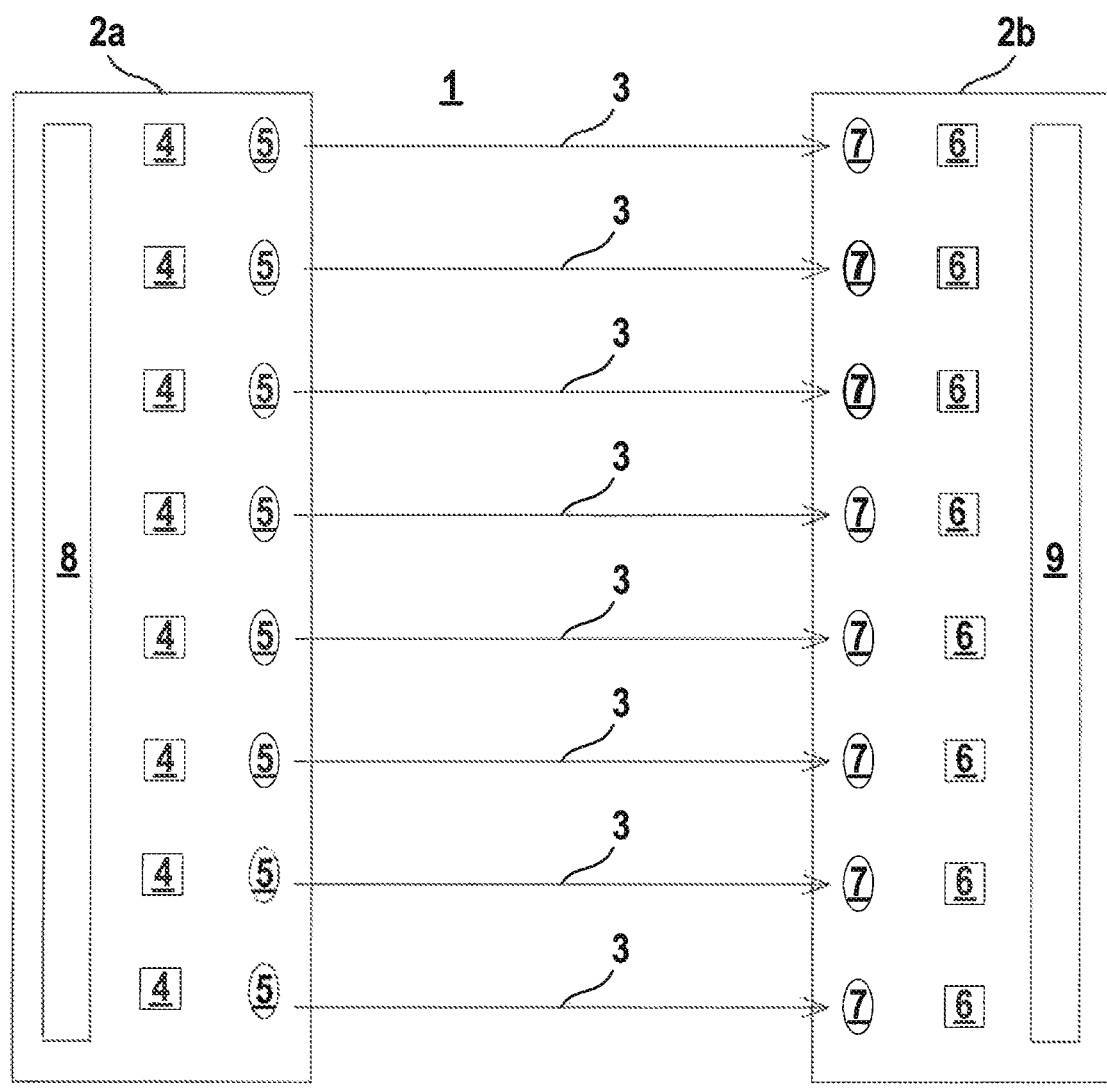
FIG. 1: An exemplary embodiment of the sensor according to the invention in the form of a light curtain

FIG. 1 shows schematically the structure of an exemplary embodiment of the sensor according to the invention in the form of a light curtain 1 for detecting objects within a monitoring range.

The light curtain 1 has a transmitter unit with a housing 2a, with a series arrangement of light beam 3-emitting transmitters 4 as a first sensor component and optical elements assigned thereto forming transmission optics 5. Furthermore, the light curtain 1 has a receiver unit with a second housing 2b, with a series arrangement of light beam 3-receiving receivers 6 as a second sensor component, in front of each of which an optical element is respectively arranged in the form of a receiving optics.

The housings 2a, 2b are arranged on opposite edges of the monitoring range such that a receiver 6 is arranged respectively opposite a transmitter 4 and with it forms a transmitter-receiver pair, wherein the light beams 3 of the transmitter 4 form a beam axis. In the present case, eight beam axes are provided. Naturally, the light curtain 1 can also have another number of beam axes.

Alternatively, the light curtain 1 can also be designed as a retro-reflective light curtain 1. In that case, all transmitters 4 and receivers 6 are arranged in a housing 2a or 2b that is arranged on an edge of the monitoring range. A reflector is located at the other end. When the monitoring range is free, the light beams 3 of the transmitter 4 are guided back via the reflector to the respectively assigned receiver 6.

The transmitters 4 are controlled by a transmitter control 8. An evaluation unit 9 is assigned to the receivers 6. In this context, the beam axes are individually activated in succession, cyclically. The evaluation unit 9 controls the receivers 6 and evaluates their received signals in order to generate an object detection signal in the form of a binary switching signal, the switching states of which indicate whether an object is located within the monitoring range, or not. When the monitoring range is free, the light beams 3 of the beam axes reach the receiver 6 of the respective beam axis unimpeded. When there is an intervening object, at least one beam axis is interrupted. The transmitter control 8 and/or evaluation unit 9 can have a multichannel structure if the light curtain 1 forms a safety sensor. The transmitter control 8 and/or the evaluation unit 9 can particularly be composed of two computing units cyclically monitoring one another.

For example, a hazard zone at a machine is monitored with the light curtain 1 implemented as a safety sensor. Operation of the machine is only released when the monitoring range is free. If an error is discovered in the transmitter control 8 and evaluation unit 9, a switching signal is generated in the light curtain 1 such that the machine is switched off, i.e., a transition to a safe state occurs.

Figure 2:
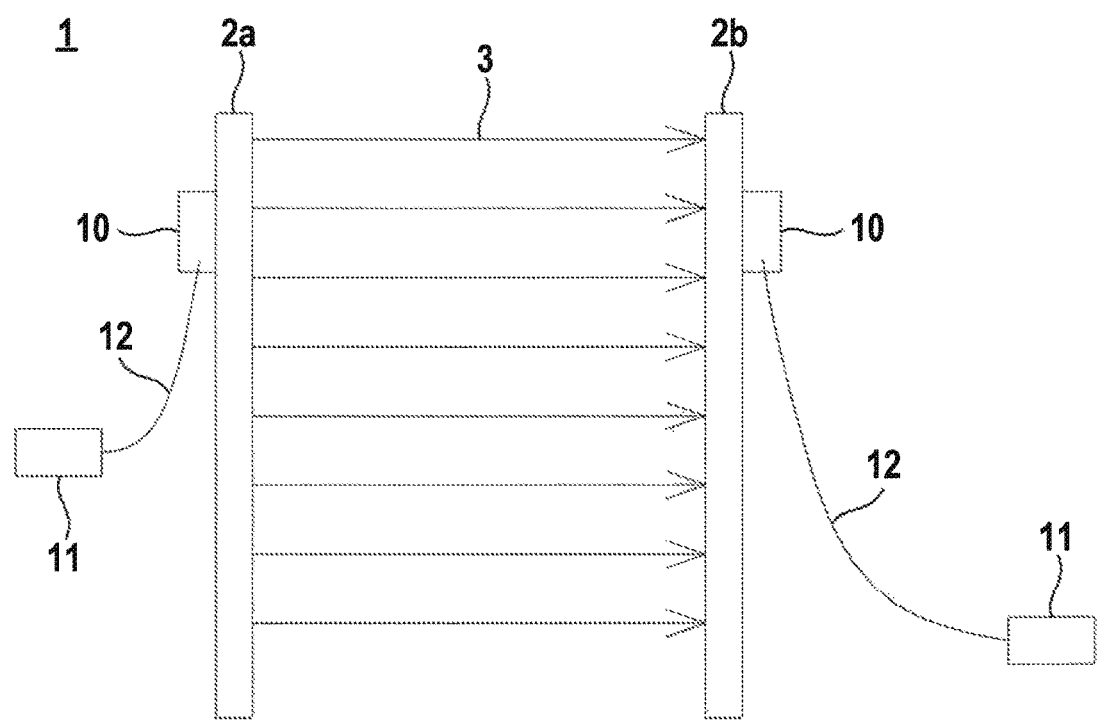
FIG. 2: A schematic depiction of the light curtain according to FIG. 1 with device connection unit and assigned connection module.

FIG. 2 shows the installation of a device connection unit 10 according to the invention on the light curtain 1, wherein the device connection unit 10 itself is connected to a connection module 11, such as, e.g., a plug connector. The device connection 10 can also be connected using a cable 12 with open cable end, without connection module.

FIG. 2 shows an embodiment in which is provided at the housing 2a of the transmitter unit as well as at housing 2b of the receiver unit. In general, a device connection unit 10 can also be provided on only one housing 2a, 2b.

The or each device connection unit 10 forms a module as a component of the sensor, particularly of the light curtain 1. The device connection unit 10 can be fixed on the respective housing 2a, 2b by means of fixing means (not shown).

In the present case, each device connection unit 10 is connected to the connection module 11 by a cable 12.

Advantageously, the connection module 11 and the cable 12 are cast or injection-molded together.

Alternatively, the device connection unit 10 and the cable 12 are cast or injection-molded together.

FIGS. 3A, 3B show a detail of the housing 2b of the light curtain 1 with a housing portion 200 on the top side of the housing 2b. The device connection unit 10 (shown in FIG. 3B) can be fixed to this housing portion 200. In the present case, the device connection unit 10 with a protrusion 10a can be inserted and latched in a corresponding receptacle of the housing portion 200.

A seal 13 is provided on the housing portion 200. The seam between the housing portion 200 and the device connection unit 10 is fully sealed with this seal 13.

On this face of the housing portion 200, the seal 13 surrounds an exposed connection field 14 with connection contacts 15, which can be connected to the connection elements of the connection module 11, to a jumper field 16 and to a connection for a configuration memory 17, wherein the configuration memory 17 can be inserted therein as illustrated in FIG. 3B. Configuration jumpers can be arranged on the jumper field 16. The configuration jumpers form electrically conductive bridges via which an electrical connection to ground, to an operating voltage, or to other contacts can be established. Together with a pull-up resistor, pull-down resistor, or a connection to another contact, a bit with two bit values can be encoded.

Configuration data is stored in the configuration memory 17. If the device connection unit 10 is connected to the connection field 14 of the housing portion 200, signal distributions are set up in the configuration memory 17 according to the configuration data, i.e., input signals and output signals of the light curtain 1 are assigned to certain connection elements of the connection module 11. Moreover, an operating mode selection can be performed for the light curtain 1 with the configuration data.

In principle, different configuration memories 17 with different configuration data can be arranged in the connection field 14. Accordingly, different signal distributions can be set to the connection elements of the connection module 11 and/or various operating modes.

Furthermore, it is possible for the or each configuration memory 17 to be parameterizable via an interface.

The functionality of the device connection unit 10 can be expanded by arranging configuration jumpers on the jumper field 16 in addition to the configuration memory 17.

A configuration can then be selected in a configuration memory 17 with the configuration jumpers.

FIG. 4 shows a variant of the embodiment according to FIGS. 3A and 3B. FIG. 4 has a connection pin 18 as a connection into which a jumper bridge 19 with configuration jumpers can be plugged. When fixing the device connection unit 10 to the housing portion 200, the jumper bridge 19 is inserted into a recess 20 on the device connection unit 10, i.e., the jumper bridge 19 is engaged by the device connection unit 10.

FIG. 5 shows an enlarged detail depiction of the arrangement from FIG. 4. As evident from FIG. 5, the jumper bridge 19 has a notch 21.

When the jumper bridge 19 is inserted into the recess 20 of the device connection unit 10, a clamping device 22 is inserted into the notch 21, by which the jumper bridge 19 is fixed to the device connection unit 10. The clamping device 22 can be an elastic element, e.g., a spring, a clamp, an elastomer element, and the like.

Signal distributions for connection elements of the connection module 11 as well as operating modes of the light curtain 1 can be preset with the configuration jumpers of the jumper bridge 19 in the same way as with the configuration memories 17.

Naturally, such a jumper bridge 19 can also be inserted on the device side and establish the corresponding connections in the device connection unit 10.

In the arrangements of FIGS. 4 and 5, the jumper bridge 19 can also be replaced by a configuration memory 17.

Naturally, such a configuration memory 17 can also be inserted on the device side and establish corresponding connections in the device connection unit 10, which then establish an electrical connection to the device side via other contacts.

LIST OF REFERENCE NUMERALS (1) light curtain
(2a) housing
(2b) housing
(3) light beam
(4) transmitter
(5) transmission optics
(6) receiver
(7) receiving optics
(8) transmission control
(9) evaluation unit
(10) device connection unit
(10a) protrusion
(11) connection module
(12) cable
(13) seal
(14) connection field
(15) connection contact
(16) jumper field
(17) configuration memory
(18) connection pin
(19) jumper bridge
(20) recess
(21) notch

(22) clamping device
(200) housing portion

The invention claimed is:

1. A sensor for detecting objects within a monitoring range, with sensor components and an evaluator (9),
wherein an object detection signal is generated in the evaluator (9) in dependence upon sensor signals of the sensor components,
characterized in that the sensor has a device connector (10), which has a connector configured for connecting to a cable (12) or a connection module (11),
and that configuration jumpers and/or a configuration memory (17) can be attached to the device connector (10),
whereby an operating mode of the sensor can be preset and/or a signal distribution can be preset to connection elements of the connection module (11)
and wherein a configuration in a configuration memory (17) can be selected with configuration jumpers.

2. The sensor according to claim 1,
characterized in that its input and/or output signals are assigned to connection elements of the connection module (11) by means of the configuration memory (17) and/or the configuration jumpers.

3. The sensor according to claim 1,
characterized in that different configuration jumpers or configuration memories (17) can be attached to the device connector (10).

4. The sensor according to claim 1,
characterized in that the configuration memory (17) or each configuration memory (17) can be parameterized via an interface.

5. The sensor according to claim 1,
characterized in that it has at least one housing (2a, 2b), wherein the device connector (10) can be fixed to a housing portion (200) of the housing (2a, 2b).

6. The sensor according to claim 5,
characterized in that the configuration memory (17) and/or configuration jumpers having jumper bridges (19) can be plugged in at the housing portion (200) or in the device connector (10).

7. The sensor according to claim 6,
characterized in that, when the device connector (10) is fastened to the housing portion (200), the configuration memory (17) and/or the jumper bridges (19) are engaged by the device connector (10) or housing portion (200).

8. The sensor according to claim 5,
characterized in that the configuration memory (17) and/ or the jumper bridges (19) can be plugged in at the device connector (10) or the housing portion (299).

9. The sensor according to claim 8,
characterized in that, when the device connector (10) is fixed to the housing portion (200), the configuration memory (17) and/or the jumper bridges (19) are engaged by the device connector (10) or housing portion (200).

10. The sensor according to claim 5,
characterized in that hardwired jumper bridges (19) are provided in the device connector (10).

11. The sensor according to claim 1, characterized in that a seal (13) is provided between the housing portion (200) and the device connector (10).

12. The sensor according to claim 1,
characterized in that the connection module (11) is a plug connector.

13. The sensor according to claim 1,
characterized in that the connection module (11) is connected to the device connector (10) by a cable (12).

14. The sensor according to claim 13,
characterized in that the connection module (11) and the cable (12) are cast or injection-molded together.

15. The sensor according to claim 13,
characterized in that the device connector (10) and the cable (12) are cast or injection-molded together.

16. The sensor according to claim 1,
characterized in that it is an optical sensor.

17. The sensor according to claim 16,
characterized in that the optical sensor is designed in the form of a light curtain (1) or area distance sensor.

18. The sensor according to claim 1,
characterized in that it is a safety sensor.

19. A method for operating a sensor for detecting objects within a monitoring range, with sensor components and an evaluator (9),
wherein an object detection signal is generated in the evaluator (9) in dependence upon sensor signals of the sensor components,
characterized in that the sensor has a device connector (10) having a connector designed for connecting to a connection module (11),
and that configuration jumpers and/or a configuration memory (17) can be attached to the device connector (10), by which a signal distribution can be preset to connection elements of the connection module (11) and/or an operating mode of the sensor can be preset,
and wherein a configuration in a configuration memory (17) can be selected with configuration jumpers.

* * * * *